3,406,391
VEHICLE IDENTIFICATION SYSTEM
Mihran Le Von, Jr., Box 341, Venice, Calif. 90291
Continuation-in-part of application Ser. No. 463,531, June 14, 1965. This application Feb. 13, 1967, Ser. No. 639,004
22 Claims. (Cl. 343—6.5)

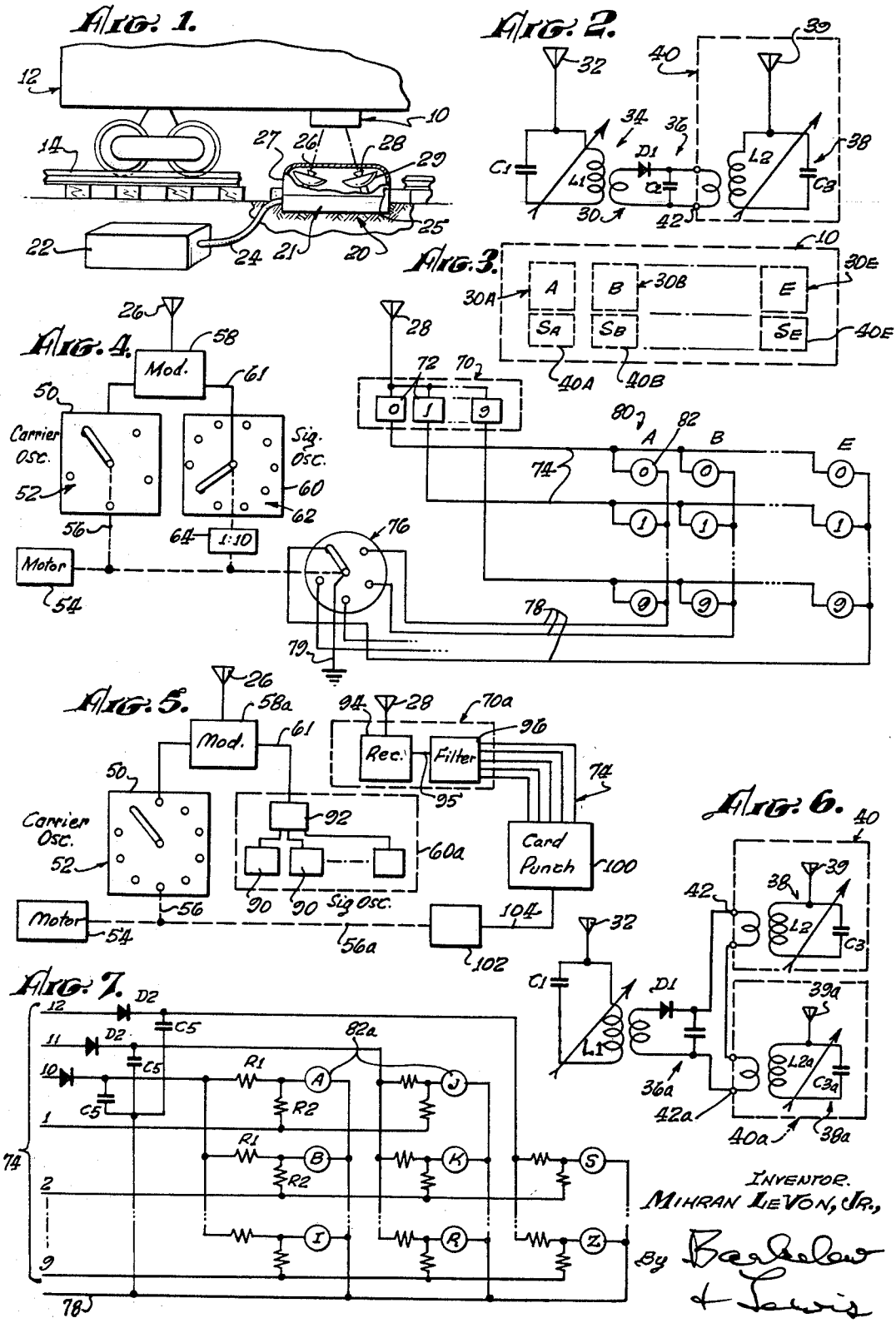

ABSTRACT OF THE DISCLOSURE

The described systems for identifying vehicles or other relatively movable stations transmit to such station interrogaitng electromagnetic radiation that comprises one or more carrier frequencies and at least one sideband of each carrier representing one or more signal frequencies. The interrogating radiation associated with each carrier is received at the station and is separately demodulated to obtain the signal frequencies. Certain of the signal frequencies are selected, typically by means of resonant circuits, in accordance with a predetermined code. The selected frequencies are directly radiated as an identification of the station. The identifying radiation thus comprises directly radiated signal frequencies that were supplied by carrier transmission from the interrogating station.

---

This application is a continuation-in-part of my application, Ser. No. 463,531, filed June 14, 1965, now abandoned, under the same title.

This invention has to do with the automatic identification of moving vehicles.

Vehicle identification systems in accordance with the invention may be employed for identifying many different types of vehicles, typically providing automatically a visual indication or a permanent record of each vehicle passing an identification station. Such a station may be established close to a railroad track, for example, for identifying the freight cars passing over the track, adjacent a highway for identifying motor vehicles using the highway, or adjacent the path of other moving objects such as containers on a conveyor belt or devices under construction on an assembly line. The term "vehicle" is employed in the present specification and claims as embracing any such movable objects.

Identification systems of the described type are useful even if their operation requires movement of the vehicles at a relatively slow speed, as in a railway switching yard, for example. However, a primary purpose of the present invention is to provide an identification system that is also capable of identifying vehicles as they pass a station at full normal speed.

A further object of the invention is to provide a vehicle identification system in which the equipment that must be carried by each vehicle is extremely simple and economical and requires little or no maintenance. That feature is especially significant for the illustrative uses that have been mentioned, since the number of vehicles to be identified is typically far larger than the number of identifying stations that are needed.

Whereas the invention is particularly useful for identifying a moving vehicle from a fixed station, and is described herein primarily from that viewpoint, it is immaterial which of the two relatively movable stations, if any, is fixed relative to the ground. As is pointed out explicitly in the prior art, it is true also of the present invention that an identification system may be used for one application with the interrogating station mounted on a moving vehicle and with responding stations located at various intervals along a roadway, for example, and for another application the interrogating and responding stations may be interchanged, with the interrogator beside a conveyor, for example, and the responder mounted on an object carried by the conveyor.

In preferred form of the invention, each vehicle carries a series of units that represent any desired identifying letters, numerals or other symbols in accordance with a definite predetermined code, utilizing positional notation. Those units are identified by means of electromagnetic radiation by equipment at the ground station, and that identification is then translated by means of the known code into the coventional symbols that designate the vehicle. The present invention permits the symbol-representing units on the vehicle to be readily interchanged whenever it is desired to change the conventional designation of the vehicle.

A particular advantage of the present invention is that the equipment carried by the vehicles is entirely passive, in the sense that it requires no local source of power. That equipment comprises a signal-powered coded transponder, which receives a signal frequency radiated to it by carrier transmission from a ground station, responds selectively to that signal, and, under suitable conditions, utilizes the power contained in the received signal to radiate back to the ground station a response in the form of the selected signal frequency itself, which is readily interpretable in terms of a definite code for identification of the vehicle.

The system of the invention is especially well adapted for producing a running record in printed or other form of the identifying symbols of the passing vehicles.

In illustrative form of the invention, each vehicle is provided with a transponder assembly, comprising a plurality of tuned resonant circuits for receiving electromagnetic radiation of definite respective frequencies, one frequency for each symbol of the ordered series by which the vehicle is identified. Associated with each receiving circuit on the vehicle is another tuned circuit adapted to radiate electromagnetic radiation of a definite lower frequency, which represents the value of that particular symbol. The receiving and transmitting circuits are coupled in a suitable manner, typically via a diode or other non-linear device and a low-pass filter. The ground station projects to the vehicle radiation of a definite carrier frequency, amplitude modulated by a signal frequency. If the carrier frequency corresponds to one of the tuned receiving circuits of the vehicle, the signal frequency is supplied to the coupled transmitting circuit. If the frequency of the latter circuit matches the signal frequency, an output signal of that frequency is returned to the ground station. Otherwise not. Thus, it is a characteristic of the present invention that the transponder circuits select one or more of a plurality of signal frequencies transmitted from the ground station. The selected frequency of frequencies are then directly radiated to the ground station. The transponder apparatus carried by the vehicle is not required to include any means for generating a new frequency, nor is it required to include any means for modulating a carrier frequency.

In a practical system, the described vehicle transponder assembly is typically "interrogated" by a series of carrier waves, modulated by respective different signal frequencies. The interrogating modulated carrier waves typically comprise a two-dimensional array embracing carrier frequencies for all the respective symbols, and modulation or signal frequencies for all possible symbol values. For example, if the vehicles are identified by an ordered series of five decimal digits, the interrogating station projects, typically sequentially, five different carrier frequencies corresponding, respectively, to the first, second, etc., digit; and each carrier frequency is modulated, either sequentially or simultaneously, by ten different signal frequencies corresponding, respectively, to the ten digit values 0, 1 . . . 9. The receiving circuit for each symbol on the vehicle is energized only by the corresponding carrier frequency; and the associated transmitting circuit is energized only when the received carrier frequency is modulated by the appropriate signal frequency. The signals returned to the ground station are readily identified with the proper carrier wave, indicating for each symbol which of its possible values is represented by the vehicle-carried circuitry. If it is desired to change one or more of the symbol values for that vehicle, it is only necessary to re-adjust the transmitting portion of the circuit or replace it by one with the proper resonant frequency.

It is well known that transmission of a signal frequency by means of amplitude modulated carrier may take the form of the carrier and only one sideband. Moreover, such "carrier and single sideband" transmission may be generated directly by means of oscillators operating at the carrier frequency and at the sideband frequency, respectively, without the signal frequency appearing explicitly at the transmission station. The prior art shows that type of generation of carrier transmission as the functional equivalent of conventional amplitude modulation in interrogation systems of the present general type. The systems of the present invention can utilize such equivalent types of carrier transmission of the signal frequency or frequencies for interrogation. Selective reception of such transmission is essentially the same as for ordinary double sideband transmission, except that if selection is accomplished by a tuned resonant circuit the latter can be somewhat more narrowly tuned for single than for double sideband transmission.

By coupling each vehicle receiving circuit to several transmitting circuits, each with its own signal frequency, that vehicle will respond to each of the signal frequencies when interrogated, permitting the use of more complex, and at the same time more compact, codes. That is especially convenient when letters of the alphabet are employed as identifying symbols.

A particular advantage of the described type of identifying system is that the vehicle-carried equipment for each digit of the identifying number is typically entirely independent electrically, and can be independent also mechanically, of that for the other digits. That greatly facilitates interchange of units. Also, if the equipment for one digit should be damaged in any way or otherwise rendered inoperative, the remaining digits continue to operate normally.

A full understanding of the invention and of its further objects and advantages will be had from the following description of certain illustrative manners in which it may be carried out. The particulars of that description, and of the drawings which form a part of it, are intended only as illustration and not as a limitation upon the scope of the invention, which is defined in the appended claims.

In the drawings:

FIG. 1 is a schematic elevation, partly cut away, representing an illustrative embodiment of the invention for identifying freight cars;

FIG. 2 is a schematic diagram representing an illustrative vehicle-carried transponder unit;

FIG. 3 is a schematic diagram representing an illustrative complete vehicle-carried transponder assembly;

FIG. 4 is a schematic diagram representing an illustrative interrogating station;

FIG. 5 is a schematic diagram corresponding to FIG. 4 and representing a modification;

FIG. 6 is a schematic diagram corresponding to FIG. 2 and representing a modification;

FIG. 7 is a fragmentary schematic diagram corresponding to a portion of FIG. 4 and representing a modification;

Figure 8:
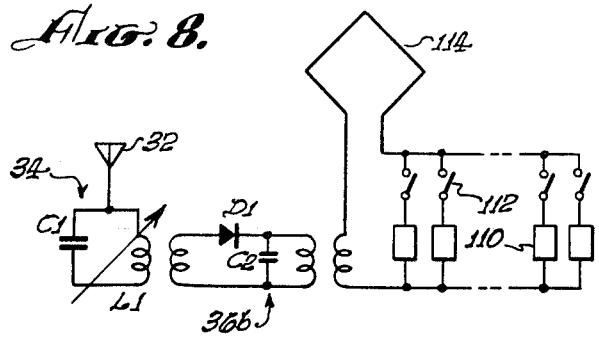
FIG. 8 is a schematic diagram representing a further modification.

As represented in FIG. 1, a transponder assembly 10 in accordance with the invention is typically mounted beneath a vehicle in position to receive radiation projected upwardly toward it from a fixed interrogating or ground station 20. In the present embodiment, the vehicle is shown as a railway freight car 12, operating on the rails 14. The ground station typically comprises a transmitting and receiving unit 21, which is partially set into the ground between rails 14, and a control and output unit 22, which is connected to unit 21 by a cable 24 and may be positioned as desired, for example within a wayside station building or simply within a weather proof case. The ground equipment may be divided between such units in any convenient manner. Unit 20 typically includes a sending antenna 26 and a receiving antenna 28. Such antennas are preferably directional, as indicated schematically by the reflectors 27 and 29. The antenna structures are preferably covered by a protective shell 25 of material transparent to electromagnetic radiation of the frequencies to be employed.

Transponder assembly 10 typically comprises a plurality of similar units 30, one of which is shown schematically in FIG. 2. The receiving antenna 32 of the transponder unit is coupled to a tuned resonant circuit of any suitable type, indicated schematically at 34 and typically comprising the capacitance C1 and the inductance L1. Such components may appear explicitly in the circuit, or may represent distributed constants of tuned structures such as transmission lines or cavity resonators, for example. Similarly, the function of antenna 32 may be performed by other circuit components so that no specific antenna structure is required. The arrow associated with circuit 34 indicates that it can be tuned accurately to a predetermined frequency. However, that frequency may be factory adjusted and need not be variable in the usual sense. Circuit 34 preferably has a relatively high Q, but is responsive to a pass band of appreciable width. Circuit 34 is coupled to a demodulating circuit of any suitable type. Such a circuit is shown schematically at 36 as comprising a series connected nonlinear device such as the diode D1 and a filtering network indicated as the shunt capacitance C2. In practice the distributed capacitance may provide adequate filtering action.

The demodulated output of circuit 36 is coupled to a second tuned resonant circuit, indicated at 38, typically comprising the capacitance C3 and the inductance L2. Circuit 38 is coupled in any suitable manner to the transmitting antenna indicated schematically at 39, typically integrated with the circuit as a conventional ferrite loop antenna. Circuit 38 is tunable to a definite predetermined frequency, but need not be variable in the usual sense. The coupling between the circuits 34, 36 and 38 may, under appropriate conditions, utilize capacitive coupling, a transformer, or a pickup loop in a resonant cavity, for example.

If antenna 32 receives electromagnetic radiation of a frequency A within the pass band of resonant circuit 34, that tuned circuit will be energized. If the received electromagnetic radiation is amplitude modulated by a lower frequency S within the pass band width of the tuned resonant circuit, the modulation component is also received and is coupled to demodulating circuit 36, which separates out the modulation frequency. If the resonant frequency of transmitting circuit 38 matches the modulation frequency S supplied from circuit 36, a signal of that frequency is radiated by antenna 39. Thus, transponder unit 30 performs the distinctive and highly selective function of responding to a definite carrier frequency A that is modulated by a definite signal frequency S. When so energized, the transponder unit radiates a signal at frequency S. The transponder unit is non-responsive to any other combination of carrier and modulation frequencies. Power for operation of the transponder unit is derived solely from the incoming radiation received by antenna 32, and no local source of power is required.

In accordance with a further aspect of the invention, each transponder unit 30 preferably comprises a fixed portion and a removable or interchangeable portion, indicated in FIG. 2 by the box 40. That interchangeable portion 40 comprises the transmitting tuned circuit 38 and for practical reasons typically includes also the coupling between circuits 36 and 38 and may include transmitting antenna 39. Portion 40 is constructed as a unit that is mechanically detachable and is electrically connected to the rest of the system by a suitable connector of conventional type, indicated at 42. Transmitting unit 40 can then be replaced conveniently by another having a different resonant signal frequency.

An illustrative complete transponder assembly 10 is shown schematically in FIG. 3, comprising a plurality of units similar to unit 30 of FIG. 2. Those units are designated 30A, 30B, etc., through 30E, making a total of five units in all, that number being pure illustrative. Each unit comprises a receiving and demodulating portion, marked with a letter A, B, etc., to indicate the carrier frequency to which it is resonant, and a transmitting portion, shown as a separate unit corresponding to unit 40 of FIG. 2 and designated 40A, 40B, etc. Those transmitting units are tuned to respective signal frequencies indicated as $S_A$, $S_B$, etc.

If the vehicle is to be identified in terms of any positional notation involving five symbols, such as a five-digit decimal number, for example, five different carrier frequencies, A, B, C, D and E are used; and for decimal digits each of the signal frequencies may have any one of ten different values, according to some definite code by which each decimal digit value is represented by a particular signal frequency. By suitable selection of the plug-in units 40A through 40E, assembly 10 can conveniently be made to represent any selected five-digit number. It is usually more convenient, though not essential in principle, to use the same code and the same signal frequencies for value representation of all digits that are of similar character.

FIG. 4 represents schematically an illustrative station for interrogating a vehicle-carried transponder of the type just described and for receiving and interpreting a returned signal identifying the decimal number represented by that transponder. The five carrier frequencies are generated sequentially and cyclically by an oscillator 50 which is shiftable to vary the output frequency among the desired values. Such shifting may, for example, be accomplished in conventional fashion by connecting different capacitance values into the tank circuit of the oscillator, as by the five-position rotary stepping switch indicated at 52. Alternatively, switch 52 may be considered to energize sequentially five different oscillators having respective different characteristic frequencies. That switch is driven by any desired cyclic frequency by the motor 54 via the mechanical coupling indicated schematically at 56. The output from carrier oscillator 50 is modulated, as indicated schematically by the modulator 58 receiving a modulation signal via the line 61.

That modulation signal is typically developed by a second oscillator 60, the output frequency of which is variable stepwise under control of the ten-position rotary stepping switch 62. Switch 62 is driven at such speed that it completes one cycle of frequencies while switch 52 is resting at each of its five positions. That drive may for example, utilize motor 54 and a gear box of suitable ratio, indicated at 64. Either or both of switches 52 and 62 may have additional positions that are blank or that otherwise mark in an identifiable manner the separation of successive cycles of frequency variation.

The oscillators may be designed to produce any desired sets of carrier and modulation frequencies, depending upon such factors as the transmission distance to the vehicle-mounted transponder assembly, the desired type of circuitry to be used, and other engineering considerations. In general, it is preferred that the carrier frequen-cies have values in the range normally referred to as microwave frequencies, and that the modulation or signal frequencies have values in the radio frequency range. For example, the carrier frequency values may approximate 1500 megacycles and be separated from each other by intervals of the order of 20 megacycles; and the signal frequencies may approximate 2000 kilocycles and be separated by intervals of the order of 10 kilocycles.

Modulator 58 may be of conventional type, modulating the carrier wave by the signal frequency received over line 61 and supplying the resulting modulated wave train, possibly with additional amplification, to transmitting antenna 26, already described in connection with FIG. 1. The modulating signal may be applied to a control electrode or component of the carrier oscillator itself, effectively turning that oscillator on and off during each cycle of modulation, so that no modulating circuit may appear explicitly in a practical system.

The signal received from transponder assembly 10 is picked up by antenna 28 and supplied to receiver 70. That receiver comprises any suitable type of circuitry for discriminating the frequency of the received signal and producing an output signal of any suitable type, preferably a voltage pulse on the correct one of a plurality of distinct output lines. As here shown, receiver 70 comprises ten distinct and effectively independent receivers 72, one for each of the ten signal frequencies that represent alternative digit values. Those receivers are connected in parallel to antenna 28, and each is connected to its separate output line 74. The signal returned from transponder assembly 10 then energizes only one of the receivers, producing a control signal of any desired type on the corresponding output line 74. That line corresponds to the digit value represented by the received signal frequency.

Each control signal on one of the lines 74 must be associated correctly with the particular digit, the value of which it represents. That may be accomplished by deriving from carrier oscillator 50 a control signal representing the carrier frequency that is being generated at the time. For example, a five-position rotary switch 76 may be driven in synchronism with switch 52 to supply a signal to a particular one of the five lines 78 in accordance with the carrier frequency being generated. With that illustrative signal arrangement, the output of the system may utilize a two-dimensional array 80 of two-terminal elements 82. One terminal of each element is connected to one of the lines 74 and the other terminal to one of the lines 78, in such a way that each column of elements represents one of the ordered digits of the vehicle identifying number and each row of elements represents one of the ten values that such digit may have. Then, for example, if the signal on lines 74 constitutes a voltage and the signal on the lines 78 constitutes a connection to a return path, shown schematically as electrical ground at 79, each complete cycle of interrogating frequencies will cause intermittent energization of one of elements 82 in each column, the element energized in each column representing the digit value for the digit represented by that column. The elements 82 may comprise visual devices such as neon lamps, for example, which glow in response to energization and can be observed and manually recorded by an operator. Alternatively, the elements 82 may comprise magnetic or other memory devices of known type. Conventional apparatus may then be provided for reading out the data recorded during each complete cycle of interrogation and for transferring that data to any desired permanent form of record, such as punched cards or the like.

FIG. 5 represents schematically a modified interrogating system which the vehicle-carried transponder is interrogated for the respective digits time-sequentially, as in the system of FIG. 4, but is interrogated simultaneously for all values of any one digit. For that purpose carrier frequency oscillator 50 may be as already described, with frequency shifting switch 52 driven from motor 54. Signal frequency oscillator 60a, however, typically comprises an array of fixed frequency oscillators 90, one for each of the signal frequencies. The outputs of all the oscillators 90 are supplied to the mixer 92, which may be of conventional type, and the resulting modulating signal, containing all ten, say, modulating frequencies, is supplied via the line 61 to the modulator, shown schematically at 58a. The radiation projected by antenna 26 then consists of a time sequence of carrier frequencies, each modulated simultaneously by all the signal frequencies.

In operation of such a system, during radiation of the carrier frequency for the third digit, for example, the corresponding transponder unit on the vehicle is energized and all ten signal frequencies are supplied to the transmitting resonant circuit 38 of that unit (FIG. 2). That circuit is then necessarily energized, but responds only to the signal frequency to which it is resonant. In effect, it selects that particular signal frequency and radiates it back to the ground station. The receiving portion of the interrogating station may be constructed as already described in connection with FIG. 4.

FIG. 5 further illustrates modified receiving means at the interrogating station, whereby receiver 70a comprises a single broad band receiver 94 which is capable of receiving and typically amplifying the signal from the vehicle-carried transponder regardless of which digit value it represents. That signal is supplied via the line 95 to a filter network of any suitable type, indicated schematically at 96, which distinguishes the respective signal frequencies and supplies an output signal on the appropriate one of the output lines 74. That output signal is typically similar to the signal produced on lines 74 by the system of FIG. 4, and may be utilized in a similar manner.

FIG. 5 further illustrates a modified output system for the information received from the interrogation procedure. The numeral 100 represents a mechanism of known type for punching cards in accordance with input signals. Such cards may be of the commonly used type known as IBM cards, which have a large number of positions arranged in a two dimensional array of columns and rows. The punching mechanism typically selects the column to be punched in accordance with an input signal in the nature of a stepping signal, which causes the machine to progress sequentially from one column to the next in response to each signal pulse. In each column, the row to be punched is typically determined by an input signal on a different line for each row. The signals already described on the lines 74 are of suitable type to be used directly for such row control. A suitable stepping signal for column control of device 100 can be developed by a switching device of known type, represented schematically at 102, which is driven via the coupling 56a in synchronism with the control 52 of carrier oscillator 50. The signal from 102 is supplied to punch device 100 via the line 104.

With an arrangement of that type, the results of the described interrogation procedure can be recorded directly as they are received. Card punching mechanism 100 preferably includes means of known type by which it is actuated only in presence of input signals of suitable amplitude; and by which, following one complete cycle of operation, the punching mechanism does not operate again until reset by loss of the input signal. Then only one card is punched for each vehicle even though the interrogating system is cycled continuously. If information is accumulated faster than it can be recorded by a mechanical card punching device such as 100, conventional information storage techniques may be employed for storing the information temporarily and supplying it to a card punch or other means for processing such data at an appropriate time.

For clarity of illustration, the switching devices of FIGS. 4 and 5 have been shown and described as mechanically driven switches. It will be recognized that the switching functions they perform can be accomplished alternatively in known fashion by means of electronic switching circuits. Switching of the latter type has the greatest advantage that it can be performed extremely rapidly.

Further, the effect of switching between adjacent discrete frequencies can be accomplished by continuously varying the frequency, as by means of a frequency control voltage having the form of a ramp function, or by continuously driving a variable capacitance connected to the tank circuit of the oscillator, for example. Such techniques are especially suitable for effectively switching the carrier frequency in the system of FIG. 5, where all signal frequencies are interrogated simultaneously, since only a very brief burst of modulated radiation of each carrier frequency is required to obtain a translatable return signal containing complete information. Such a brief burst of carrier frequency may be obtained by supplying energizing voltage to the oscillator only during brief intervals as it passes through the desired discrete carrier frequencies. Or, the oscillator may be continuously energized, and the resonant receiving circuits 34 of the respective transponder units relied upon to render the radiation ineffective except when its frequency closely approximates one of the selected carrier frequencies.

The radiation beams both to and from the vehicle carried transponder are preferably focused to a suitable extent to utilize maximum "gain" while retaining a sufficiently wide beam to insure that the anticipated rate of vehicle movement will not interrupt the interrogation cycle for each vehicle before it is completed. For example, with beams approximating two feet in diameter at the receivers, and with a complete interrogation period of the order of 0.01 second, a system in accordance with the present invention is capable of identifying vehicles satisfactorily at speeds of the order of 70 miles per hour.

The invention is capable of modification in many different respects, as, for example, to permit utilization of more complex codes than the simple decimal notation described above. In particular, if it is desired to include letters of the alphabet as well as numerals for designating vehicles, the letters may be represented by means of a conventional code such as that known as the Hollerith code, and used by IBM and many other computers. That illustrative code utilizes code elements capable of twelve distinct values, rather than ten as in ordinary decimal notation. Those code element values may be represented for convenience by the numerals 1, 2, 3 . . . 12. The letters of the alphabet are arranged in three columns and nine rows, as follows:

|   | 12 | 11 | 10 |
|---|----|----|----|
| 1 | A  | J  |    |
| 2 | B  | K  | S  |
| 3 | C  | L  | T  |
| 4 | D  | M  | U  |
| 5 | E  | N  | V  |
| 6 | F  | O  | W  |
| 7 | G  | P  | X  |
| 8 | H  | Q  | Y  |
| 9 | I  | R  | Z  |

The rows of the table are designated by nine of the twelve values of the code elements, and the other three values designate columns of the table, as indicated above. Any letter can then be represented by two code element values, one selected from the series 1 to 9 and the other selected from the series 10 to 12. The present invention permits both of those element values to be transmitted by a single carrier frequency and in the same time that would be required for transmission of only a single element value selected from the series 1 to 12.

That is typically accomplished by modifying each transponder unit that is to designate a letter. In place of the single transmitting circuit 38 of FIG. 2, two transmitting resonant circuits are provided, both coupled to the previously described receiving and demodulating circuits 34 and 36. The two resonant transmitting circuits are tuned to different frequencies. One of those frequencies is selected from the signal frequencies that represent the code element values 1 to 9, and the other is selected from the frequencies that represent the code element values 10 to 12, the specific selections corresponding to the desired letter in accordance with the code designations. FIG. 6 represents schematically an illustrative transponder unit having two transmitting circuits 38 and 38a, with respective radiating antennas 39 and 39a. The circuits 38 and 38a are both coupled to circuit 36a, as by respective coupling coils series connected in circuit 36a, which may be otherwise essentially like circuit 36 of FIG. 2. The two transmitting circuits may be fabricated as separate interchangeable units 40 and 40a, in the manner already described in connection with FIG. 2, and are so shown in FIG. 6. Alternatively, both transmitting circuits and their associated components may comprise a single demountable unit. In the former case, only twelve different types of units must be provided and stocked, from which two selections must be made to represent a desired letter. In the latter case, only one unit need be selected to represent a desired letter, simplifying the process of changing the designation of a vehicle, but at the cost of constructing and stocking 26 different types of units.

With the illustrative transponder unit of FIG. 6, the interrogating system for a code such as that in the table may be similar to that already described in connection with either FIG. 4 or FIG. 5, except that twelve different signal frequencies are required. Whether each carrier frequency is modulated by those signal frequencies sequentially or simultaneously, the transponder unit of FIG. 6 responds to two of those frequencies, typically energizing two of the output lines 74 of FIG. 4 or FIG. 5. The translating portion of the interrogation system may be essentially similar to those already described, but with provision for a larger number of symbol values each of which is energized only in response to coordinated energization of two of the lines 74.

Illustrative modification of the system of FIG. 4 is represented schematically in FIG. 7. Each column of indicating elements 82 of FIG. 4 that corresponds to a letter rather than to a decimal digit is replaced as in FIG. 7 by 26 elements 82a, shown for clarity of illustration arranged in a two-dimensional array corresponding to the above code table. The right hand terminals of all those elements are connected in parallel to one of the control lines 78, which is typically grounded selectively as described in connection with FIG. 4. The left hand terminal of each indicating element is coupled to two of the lines 74, one selected from the values 1 to 9 and the other from the values 10 to 12, as shown, those connections including an "and" network of any suitable type such that the element 82a is not energized unless both lines 74 are energized simultaneously. Those "and" networks are shown illustratively as the adding resistors R1 and R2, it being understood that the values of the resistors are so selected, with attention to the characteristics of the elements 82a, that element energization occurs only if voltage is supplied through both resistors.

In the case of sequential interrogation with respect to the various signal frequencies, as described in connection with FIG. 4, the row-determining pulse and the column-determining pulse for each letter on lines 74 are not simultaneous, so that proper energization of the device 82a may require some means for prolonging one or both of those two pulses to insure an effective overlap. As shown schematically in FIG. 7, each of the lines 74 that represents a column-determining symbol value, that is, the digit values 10, 11 and 12, is shunted via a capacitance C5 to return line 78. A diode D2 may be inserted in each line in proper polarity to prevent the capacitance from discharging via the line following a pulse. Alternatively, similar delay networks might be provided for the lines 74 associated with the row-determining digit values 1 to 9. In either case, the sequence of interrogation is made such that for each identifying letter the carrier is modulated first by the group of signal frequencies with the delay networks and then by those without.

Just as the above described Hollerith code permits representation of 26 different symbol values by only 12 signal frequencies, a similar code can represent the ten values of a decimal digit by less than ten signal frequencies. For example, the system of FIG. 6 may be modified by providing additional slection circuits similar to 38 and 38a, the selection circuits being tuned to different respective signal frequencies each of which represents a binary digit. Four such binary digits can represent a decimal digit characteristic of 1 the responding station by means of any desired binary coded decimal code. If it is desired to transmit several decimal digit values in that manner, it is convenient to replace the series-coupled resonant circuits of FIG. 6 by parallel-connected resonant circuits utilizing piezoelectric crystals with switch means for selecting the appropriate binary digits for representing the desired decimal values.

FIG. 8 represents schematically a transponder circuit of that type, with a selected number of piezoelectric elements 110 connected in parallel and coupled to the output of demodulating circuit 36b. A selection switch 112 is connected in series with each piezoelectric element, in the manner described, for example, in Patent 3,169,242, issued on Feb. 9, 1965, to Richard K. Davis et al. The interrogating radiation is received in the present system by antenna 32 and typically comprises a carrier frequency corresponding to receiving circuit 34 and modulated simultaneously (FIG. 5) or sequentially (FIG. 4) by signal frequencies corresponding to all of the resonant circuit elements 110. The signal frequencies are obtained at the transponder by demodulation of the received radiation, as by the circuit indicated at 36b, and are supplied to those resonant elements that have been rendered operative by closure of the selected switches 112. The radiating antenna for the transponder is represented at 114 as a loop antenna connected in series with all selection circuits. Each selection circuit presents a high impedance at nonresonant frequencies and a low impedance at resonant frequency. Therefore any frequency supplied from demodulator 36b and corresponding to one of the selected piezoelectric elements produces a large circulating current in antenna 114 and is directly transmitted.

In the patent just referred to the responding frequencies are identical to frequencies directly present in the interrogating radiation, leading to possible interference between the interrogating and responding radiation. The system of FIG. 8 avoids those difficulties by using carrier transmission for interrogation and using direct radiation of the signal frequencies for the response. With eight selection elements 110, for example, eight binary digits are available for each carrier frequency, permitting the representation of two decimal digits as an identification of the transponder station. Further decimal digits may be provided by increasing tthe number of selection circuits 110, or by providing further carrier frequencies each of which may typically correspond to two more decimal digits.

An important advantage of the present type of idenification system, as compared with a large group of prior art systems, is that the signal frequencies that are returned as an identification of the transponder originated, either explicitly or implicitly, at the interrogating station. The signal frequencies are therefore available at the interrogating station as reference signals for coherent detection of the identifying radiation returned from the vehicle. For example, in FIG. 4 the signal frequencies may be taken from line 61, as via a branch line, and supplied as reference signals to receiver 70, which may then include coherent detection circuitry of any desired type for reducing interference and noise.

Well known advantages are obtainable by transmission of interrogating radiation in the form of carrier and single sideband, rather than the more conventional double sideband configuration. A modulated carrier exhibiting only a single sideband can be obtained by conventional modulation of the carrier, followed by elimination of one of the sidebands by filtering. When that is done, the modulating or signal frequency is, of course, present explicitly at the interrogating station, and is available for coherent detection of the returned radiation as just described.

It is also possible to generate a carrier and single sideband transmission without explicit appearance of the signal frequencies at the interrogating station. As described, for example, in Patent 3,036,295, issued on May 22, 1962, to Robert A. Kleist, the carrier and the individual sideband frequencies can be generated separately and independently by respective highly stable crystal-controlled oscillators. Those signals are then added in a linear manner and radiated by a suitable antenna. For the present purpose the resulting transmitted radiation is then essentially identical to the more common carrier and single sideband transmission generated by conventional modulation plus filtering.

Figure 9:
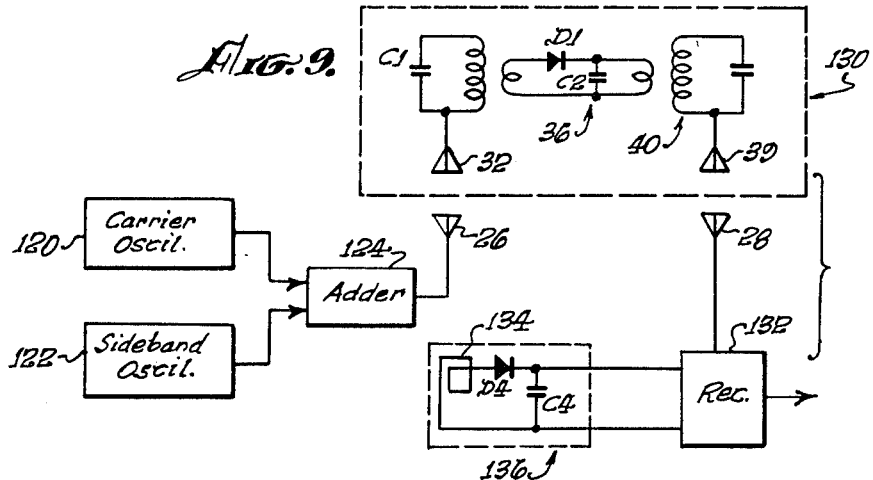
FIG. 9 is a schematic diagram representing a further modification.

FIG. 9 represents a further embodiment of the present invention which utilizes a carrier modulating system related to that of the Kleist patent just referred to. FIG. 9 further illustrated how the signal frequency can be made available at the interrogating station of such a system, for example for use as reference signal for coherent detection. Two oscillators 120 and 122 of stable type, typically regulated independently by respective piezoelectric elements, generate a carrier and at frequency $f_c$ and a sideband at frequency $f_c+f_s$ or $f_c-f_s$, where $f_s$ represents a signal frequency. If it is desired to transmit a plurality of signal frequencies, a corresponding number of independent sideband oscillators may be provided, similar to 122. Alternatively, the sideband oscillator 122 may be designed to produce a frequency that sweeps periodically over a range that effectively includes the sideband frequencies for all required signal frequencies. The oscillator outputs are combined in the liner adding circuit indicated at 124, which typically includes suitable amplification, and the resulting signal is radiated by antenna 26. If preferred, separated amplifiers and antennas may be used for the carrier and the sideband signals. The resulting radiation, in either case, is effectively a carrier of the frequency of oscillator 120 modulated by the signal frequency $f_s$ corresponding to the difference frequency of oscillators 120 and 122.

That radiation is received by the antenna 32 and resonant circuit 34 of transponder 130, and is demodulated by circuit 36. Nonlinear action of diode D1 mixes the carrier and sideband frequencies, producing a beat frequency equal to their difference. The beat frequency is separated by filtering action of C2 and is delivered as signal frequency $f_s$ to the selection and radiating section 40 of the transponder for transmission by antenna 39 back to the interrogating station. That returned signal is received by antenna 38 and receiver 132.

If it is desired to employ coherent detection of the returned signal, a reference signal may be obtained by providing at the interrogating station circuitry such as that shown at 136. That circuitry includes the pickup loop 134, which is coupled electromagnetically to the radiation field from adder 124, which includes both carrier and sideband frequencies. The output of pickup 134 is passed through a nonlinear device such as the diode D4 to obtain the beat frequency $f_s$. The carrier and sideband components are removed by the low pass filter shown as the capacitance C4, and the signal frequency is supplied as reference signal via the lines 137 to receiver 132.

If sideband oscillator 122 is swept to represent a plurality of discrete signal frequencies, the frequency of the reference signal produced by circuit 136 on lines 137 shifts correspondingly, and exhibits uniform frequency and phase relation to the identifying signal returned from the transponder. Receiver 132 may, for example, comprise separate channels selectively tuned to receive the respective signal frequencies of the selected code, all channels being supplied in parallel with the reference signal derived by circuitry 136. Any signal frequency or combination of frequencies selected and radiated by circuits 40 of the transponder then produces output signals from the corresponding channel or channels of the receiver, thereby identifying the transponder in terms of its coded frequencies.

Figure 10:
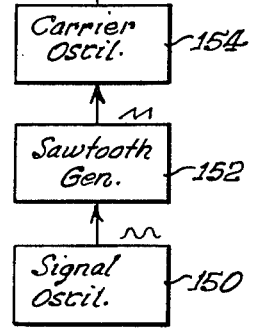
FIG. 10 is a fragmentary schematic diagram representing the interrogating portion of a further illustrative system.

FIG. 10 illustrates in simplified form a modification of the present invention in which the interrogating radiation represents a frequency modulated carrier. A signal frequency is generated by oscillator 150, which corresponds generally to oscillator 60 of FIG. 4 and to 60a of FIG. 5. The signal frequency is supplied as control signal to the sawtooth generator 152, which generates a sawtooth waveform of corresponding frequency. That waveform is supplied as control signal to carrier oscillator 154, which generates a carrier wave having an average frequency that is large compared to the signal frequency and that varies periodically over a small frequency range at the signal frequency in accordance with the sawtooth control voltage.

The transponder station for responding to radiation from the interrogator of FIG. 10 is typically as shown in FIG. 2, with the selective receiving circuit 34 tuned to a specific value within the frequency range of variation of the carrier, typically its average value. The resonant current set up in the receiver is a maximum when the carrier frequency matches the resonant frequency of circuit 34. Hence that resonant current passes through a maximum periodically at the signal frequency, and represents essentially an amplitude modulated carrier. That signal is demodulated by circuit 36 in the manner already described, supplying the signal frequency to a selection circuit such as 40 for radiation in accordance with the selected code. In practice, oscillator 150 is typically arranged to develop a plurality of signal frequencies sequentially, as already described in connection with oscillator 60 of FIG. 4, and carrier oscillator 154 may be stepped through a series of different carrier frequencies as described in connection with carrier oscillator 50 of FIG. 4.

In the present specification and claims such terms as "carrier frequency modulated by a signal frequency" are intended to include any transmission of the signal frequency by means of frequencies grouped about a carrier having a frequency that is high compared to the signal frequency. Such transmissions can be carried out by either amplitude or frequency modulations, and include not only double sideband transmissions but also such less common configurations as carrier and single sideband, whether generated by direct modulation of a wave or by a "synthetic" process such as that described in the above identified patent to Kleist.

I claim:
1. A system responsive to incoming electromagnetic radiation of a predetermined carrier frequency amplitude modulated by a predetermined signal frequency, said system comprising in combination
   resonant circuit means tuned to said predetermined carrier frequency,
   means coupled to said circuit means for energizing the same in response to incoming electromagnetic radiation of said carrier frequency,
   passive circuit means coupled to said resonant circuit means and including means for demodulating the carrier frequency to obtain therefrom an electrical signal pulsating at said signal frequency, second resonant circuit means coupled to the passive circuit means to receive said electrical signal and tuned to said predetermined signal frequency, said second resonant circuit means including means for radiating electromagnetic radiation of said predetermined signal frequency, power for energization of all said circuit means being derived solely from said incoming electromagnetic radiation.

2. A system as defined in claim 1 and wherein said passive circuit means comprise means for rectifying the carrier frequency to produce a pulsating current containing the carrier frequency and the signal frequency, and low pass filter means for deriving said electrical signal from said pulsating current.

3. A system for identifying a transponder station, comprising in combination means for projecting toward the station electromagnetic radiation of a plurality of different carrier frequencies, each modulated by a signal frequency lower than the carrier frequency, means at the station for selectively receiving each of the carrier frequencies and for demodulating the same to obtain electrical signals of the corresponding signal frequencies, means at the station responsive to at least a selected one of said signals for radiating electromagnetic radiation of the corresponding signal frequency, and means for receiving from the station the last said radiation as an indication of the identity of the station.

4. A system as defined in claim 3, and wherein said carrier frequencies are in the microwave region of the electromagnetic spectrum, and said signal frequencies are in the radio frequency region of the electromagnetic spectrum.

5. A system as defined in claim 3, and wherein power for energization of all said means at the station is derived solely from the first said electromagnetic radiation.

6. A system as defined in claim 3, and wherein said signal responsive means at the station comprise a unitary structure that is bodily demountable for substitution of a similar unitary structure responsive to at least another selected one of said signals.

7. A system for identifying a transponder station, comprising in combination means for projecting toward the station electromagnetic radiation of a plurality of different carrier frequencies, each modulated by a plurality of different signal frequencies lower than the carrier frequencies, means at the station for selectively receiving each of the carrier frequencies and for demodulating the same to obtain electrical signals of the corresponding signal frequencies, means at the station associated with the receiving means for each of the carrier frequencies and acting to radiate electromagnetic radiation of a selected one of the signal frequencies for that carrier frequency, and means for receiving from the station the last said radiation as an indication of the identity of the station.

8. A system for identifying a transponder station, comprising in combination means for projecting toward the station electromagnetic radiation of a plurality of different carrier frequencies corresponding to respective identifying symbols each of which is capable of a plurality of symbol values, means for modulating the carrier frequency for each symbol by a plurality of signal frequencies, means at the station for selectively receiving each of the carrier frequencies and for demodulating the same to obtain electrical signals of the corresponding signal frequencies, means at the station associated with the receiving means for each carrier frequency and acting to radiate electromagnetic radiation of at least a selected one of the signal frequencies representing, in accordance with a predetermined code, a particular set of symbol values associated with the station, and means for receiving from the station the last said radiation and for indicating, for each identifying symbol, the symbol value represented thereby.

9. A system a defined in claim 8, and wherein at least one of said identifying symbols is a letter of the alphabet, said plurality of signal frequencies for the carrier frequency corresponding to said one symbol includes at least twelve signal frequencies, and said radiating means at the station acts to radiate two of said twelve signal frequencies, the two radiated frequencies representing the particular letter associated with the station.

10. A system as defined in claim 8, and wherein said radiating means at the station for each carrier frequency comprise a unitary structure that is bodily demountable for substitution of a similar unitary structure for radiating at least another selected signal frequency representing another symbol value for the symbol corresponding to that carrier frequency.

11. A system for identifying a transponder station, comprising in combination means for periodically projecting toward the station electromagnetic radiation and for sequentially varying the frequency of said radiation among a plurality of carrier frequencies corresponding to respective identifying symbols each of which is capable of a plurality of symbol values, means for modulating each carrier frequency simultaneously by a plurality of signal frequencies, means at the station for selectively receiving each of the carrier frequencies and for demodulating the same to obtain electrical signals containing said plurality of signal frequencies, means at the station for radiating at least a selected one of said signal frequencies in response to the electrical signal derived from each of the carrier frequencies, said selected signal frequencies representing, in accordance with a predetermined code, a particular set of symbol values associated with the vehicle, and means for receiving from the station the last said radiation and for indicating, for each identifying symbol, the symbol value represented thereby.

12. A system for identifying a transponder station, comprising in combination means for periodically projecting toward the station electromagnetic radiation and for sequentially varying the frequency of said radiation among a plurality of carrier frequencies corresponding to respective identifying symbols each of which is capable of a plurality of symbol values, means for modulating each carrier frequency sequentially by a plurality of signal frequencies, means at the station for selectively receiving each of the carrier frequencies and for demodulating the same to obtain electrical signals pulsating sequentially at said plurality of signal frequencies, means at the station for radiating at least a selected one of said signal frequencies in response to the electrical signal derived from each of the carrier frequencies, said selected signal frequencies representing, in accordance with a predetermined code, a particular set of symbol values associated with the station, and means for receiving from the station the last said radiation and for indicating, for each identifying symbol, the symbol value represented thereby.

13. A system for identifying a transponder station, comprising in combination
- means for projecting toward the station electromagnetic radiation of at least one carrier frequency modulated by a plurality of different signal frequencies lower than the carrier frequency,
- means at the station for selectively receiving the carrier frequency and for demodulating the same to obtain electrical signals of the corresponding signal frequencies,
- means at the station selectively responsive to a selected plurality of said signals for radiating electromagnetic radiation of the corresponding signal frequencies,
- and means for receiving from the station the last said radiation as an indication of the identity of the station.

14. Apparatus adapted to be mounted at a transponder station for identifying the same, comprising in combination
- means for receiving electromagnetic radiation representing a carrier frequency modulated by a discrete signal frequency,
- means powered solely by said received radiation for deriving therefrom electrical pulsations of the signal frequency,
- and means powered solely by said electrical pulsations for radiating electromagnetic radiation of said signal frequency as an identification of the station.

15. A system for identifying a transponder station, comprising in combination
- means for projecting toward the station electromagnetic radiation representing at least one carrier frequency modulated by at least one discrete signal frequency,
- means at the station for receiving said radiation and for demodulating the same to produce electrical pulsations of the signal frequency,
- means at the station powered solely by said electrical pulsations for radiating electromagnetic radiation of the signal frequency,
- and means for receiving from the station the last said radiation as an indication of the identity of the station.

16. A system as defined in claim 15, and wherein
- said radiation projecting means comprise independently controlled oscillators at an interrogating station for generating a carrier frequency and at least one sideband frequency that differs from the carrier frequency by said signal frequency, and means for linearly adding said carrier and sideband frequencies and projecting the same as electromagnetic radiation toward the transponder station,
- and the last said radiation receiving means comprise coherent detection means at the interrogating station responsive to the signal frequency radiated from the transponder station, nonlinear circuit means at the interrogating station coupled electromagnetically to the last said radiation for producing a beat frequency between the projected carrier and sideband frequencies, and means for supplying the beat frequency as reference signal to the coherent detection means.

17. A system as defined in claim 15, and wherein
- said radiation projecting means comprise means for generating at least one signal frequency, means for generating a carrier frequency that varies periodically at the signal frequency, and means for projecting the varying carrier frequency toward the transponder station,
- and said radiation receiving and demodulating means comprise circuit means at the transponder station resonant at a frequency within the range of said periodic variation of the carrier frequency.

18. Apparatus for identifying a transponder station in response to an interrogating signal that comprises electromagnetic radiation representing a carrier frequency modulated by a plurality of discrete signal frequencies, said apparatus comprising
- a receiving unit adapted to be mounted at the station and including circuit means for receiving said interrogating signal, means for demodulating the received signal to obtain the signal frequencies, and output means coupled to the output of said demodulating means,
- a responding unit releasably mountable on the receiving unit and including means for selecting at least one of said signal frequencies and for radiating electromagnetic radiation containing said selected signal frequency as an identification of the station,
- and electrical coupling means on said units interengageable when the responding unit is mounted on the receiving unit for supplying the signal frequencies from the output means of the receiving unit to the selecting means of the mounted responding unit.

19. Apparatus for identifying a transponder station in response to an interrogating signal that comprises electromagnetic radiation representing a plurality of carrier frequencies modulated by respective pluralities of signal frequencies, said apparatus comprising in combination
- a receiving unit adapted to be mounted at the station and including a circuit means for receiving the carrier frequencies of said interrogating signal, means for demodulating the respective carrier frequencies to obtain the associated signal frequencies, and output means coupled to the outputs of the respective demodulating means,
- a plurality of responding units releasably mountable on the receiving unit in association with the respective output means thereof and each including means for selecting at least one of said signal frequencies and for radiating electromagnetic radiation containing said selected signal frequency as an identification of the station,
- and electrical coupling means on said units interengageable when a responding unit is mounted on the receiving unit for supplying the signal frequencies from the associated output means of the receiving unit to the selecting means of the mounted responding unit.

20. The method of identifying a transponder station, comprising in combination the steps of
- transmitting to the station an interrogating signal in the form of electromagnetic radiation representing at least one carrier frequency modulated by at least one signal frequency,
- receiving and demodulating the interrogating signal at the station to obtain the signal frequency,
- and transmitting from the station an identifying signal in the form of electromagnetic radiation of said signal frequency.

21. The method of identifying a transponder station, comprising in combination the steps of
- transmitting to the station an interrogating signal in the form of electromagnetic radiation representing at least one carrier frequency modulated by a plurality of signal frequencies,
- receiving and demodulating the interrogating signal at the station to obtain the signal frequencies,
- selecting at least one of the signal frequencies as an identification of the station,
- and transmitting from the station an identifying signal in the form of electromagnetic radiation of said selected signal frequency.

22. The method of identifying a transponder station, comprising in combination the steps of
- transmitting from an interrogating station to the transponder station interrogating signals in the form of electromagnetic radiation representing a plurality of carrier frequencies modulated by respective pluralities of discrete signal frequencies,
- receiving and demodulating the interrogating signals at the transponder station to obtain the signal frequencies, selecting a plurality of the signal frequencies, including at least one signal frequency that was associated with each carrier frequency, as an identification of the transponder station, transmitting from the transponder station identifying signals in the form of electromagnetic radiation of each of said selected signal frequencies, receiving the last said radiation at the interrogating station, and correlating each of the selected signal frequencies with the carrier frequency with which it was associated.

References Cited
UNITED STATES PATENTS 3,022,492   2/1962   Kleist et al. _____ 343—6.5
3,036,295   5/1962   Kleist _____ 343—6.5 X RICHARD A. FARLEY, *Primary Examiner.*

M. F. HUBLER, *Assistant Examiner.*